United States Patent
Meidan

(10) Patent No.: US 6,973,303 B1
(45) Date of Patent: Dec. 6, 2005

(54) METHOD FOR IMPROVING RECEPTION OF MESSAGES IN A COMMUNICATION NETWORK

(75) Inventor: Reuven Meidan, Ramat Hasharon (IL)

(73) Assignee: Motorola, Inc., Schaumburg, IL (US)

( * ) Notice: Subject to any disclaimer, the term of this patent is extended or adjusted under 35 U.S.C. 154(b) by 367 days.

(21) Appl. No.: 10/110,267

(22) PCT Filed: Oct. 11, 2000

(86) PCT No.: PCT/IB00/01575

§ 371 (c)(1),
(2), (4) Date: Jul. 31, 2002

(87) PCT Pub. No.: WO01/30106

PCT Pub. Date: Apr. 26, 2001

(30) Foreign Application Priority Data

Oct. 16, 1999 (GB) .................................. 9924430

(51) Int. Cl.[7] .............................................. H04M 11/00
(52) U.S. Cl. ........................ 455/421; 455/525; 455/442; 455/436; 455/452.1
(58) Field of Search ................................ 455/421, 439, 455/442, 436, 524–525, 452.1

(56) References Cited

U.S. PATENT DOCUMENTS

| | | | | |
|---|---|---|---|---|
| 5,379,447 A | * | 1/1995 | Bonta et al. ................. | 455/437 |
| 5,504,938 A | * | 4/1996 | Redden ....................... | 455/436 |
| 5,551,058 A | * | 8/1996 | Hutcheson et al. ......... | 455/429 |
| 5,570,412 A | * | 10/1996 | LeBlanc .................. | 455/456.2 |
| 5,724,662 A | * | 3/1998 | Goldberg et al. ........... | 455/503 |
| 5,787,345 A | * | 7/1998 | Moon .......................... | 455/436 |
| 5,794,149 A | * | 8/1998 | Hoo ............................ | 455/438 |
| 5,913,166 A | * | 6/1999 | Buttitta et al. .............. | 455/436 |
| 5,950,134 A | * | 9/1999 | Agrawal et al. ............ | 455/439 |
| 6,038,448 A | * | 3/2000 | Chheda et al. .............. | 455/436 |
| 6,094,427 A | * | 7/2000 | Yi ............................... | 370/331 |
| 6,125,279 A | * | 9/2000 | Hyziak et al. .............. | 455/445 |
| 6,249,252 B1 | * | 6/2001 | Dupray ....................... | 342/450 |
| 6,285,874 B1 | * | 9/2001 | Magnusson et al. ........ | 455/436 |
| 6,304,754 B1 | * | 10/2001 | DeSantis et al. ........... | 455/436 |
| 6,362,783 B1 | * | 3/2002 | Sugiura et al. ............. | 342/457 |
| 6,608,823 B1 | * | 8/2003 | Kito ............................ | 370/331 |
| 6,701,149 B1 | * | 3/2004 | Sen et al. .................... | 455/436 |
| 6,922,559 B2 | * | 7/2005 | Mohammed ................ | 455/421 |
| 2002/0102973 A1 | * | 8/2002 | Rosenberg .................. | 455/432 |
| 2003/0008656 A1 | * | 1/2003 | Yamashita et al. .......... | 455/450 |

* cited by examiner

Primary Examiner—William Trost
Assistant Examiner—Sharad Rampuria

(57) ABSTRACT

A method for optimizing a service supplied to a mobile subscriber unit in a mobile telephone system offering a multitude of voice and data services from system base stations to mobile subscriber units. According to the invention, an improved service center receives a request for service to be provided to a mobile subscriber unit. A processor within the service center determines whether prevailing conditions allow for efficient execution of the requested service and if so carries it out, and otherwise prompts the mobile subscriber unit to take remedial action whereby the requested service can be carried out more efficiently.

16 Claims, 3 Drawing Sheets

METHOD FOR IMPROVING RECEPTION OF MESSAGES IN A COMMUNICATION NETWORK

FIELD OF THE INVENTION

This invention relates to transmission of messages using telephone communication networks.

BACKGROUND OF THE INVENTION

Cellular or mobile telephones are increasingly being used for the transmission of data other than voice, requiring the provision of high bandwidth channels capable of conveying bulk traffic. It is known that in cellular telephone networks the location of the mobile subscriber unit, relative to the base station, can be a critical factor in determining whether the mobile subscriber unit will receive the transmitted signal or not. When only voice data is being transmitted, poor transmission may not be fatal because of the brain's ability to guess from the overall context, the content of a small part of the message that went astray. However, such is far from the case where non-voice data is concerned and missing data can be fatal. There have therefore been proposed various approaches for selecting the location of the base station from which data should be transmitted to the mobile subscriber unit, in order to improve reception.

U.S. Pat. No. 5,551,058 assigned to Motorola, Inc. discloses a method and system for intelligent cell selection using location data in cellular systems. A cellular communication system projects multiple cells throughout a user area. Subscriber units encounter multiple cells as they roam through the user area or as the cells migrate past the subscriber unit. When a subscriber unit encounters the fringe area of a cell it must select and transition to a target cell to maintain contact with the communication system. The subscriber unit performs an analysis of the location, proximity, and expected duration of exposure of candidate target cells using location data transmitted by control channels located in the candidate cells. The subscriber unit then selects a target cell based on these factors.

Specifically, U.S. Pat. No. 5,551,058 discloses a method of selecting a target cell for handing off a subscriber unit in a cellular communication system, said system having a plurality of transceivers projecting cells upon the earth, the method comprising the steps of:
 (a) procuring a list of at least one control channel for evaluation within said subscriber unit;
 (b) measuring a signal quality as received at said subscriber unit for one of said at least one control channel;
 (c) extracting a location data of said at least one control channel having sufficient signal quality;
 (d) retaining said location data for said at least one control channel in a group of candidate cells when said signal quality exceeds a signal quality threshold value;
 (e) repeating steps (b) through (d) for each of said at least one control channel;
 (f) ordering said group of candidate cells according to a range rate derived from said location data; and
 (g) selecting said target cell from said group of candidate cells.

Thus, according to such a method, a different base station amongst a group of potential candidates is selected to optimize received signal strength.

U.S. Pat. No. 5,504,938 also assigned to Motorola, Inc. discloses a method and apparatus for varying apparent cell size in a cellular communication system. In a satellite cellular communication system, subscriber unit traffic within any cell is managed by changing the signal level of the broadcast channel of the cells. Subscriber units located within the cells monitor the signal levels of the broadcast channels and initiate handoff requests when the signal level of the broadcast channels of the cell in which the subscriber unit is located falls below a particular signal threshold level. As demand for communication services within a cell approaches the maximum capacity of the cell, the communication system reduces the signal level of the broadcast channel within the cell, thereby encouraging subscriber units on the fringes of that cell to seek service from other cells. Thus the apparent cell size is reduced as to the subscriber units within the cell.

Thus, in such an arrangement the communication system monitors the received signal of a particular subscriber unit, and when received signal level falls below a certain threshold, reduces the signal strength of the broadcast channel. This makes all subscriber units served by that broadcast channel to seek service from another broadcast channel.

EP 823 789 assigned to LSI Logic Corporation, discloses a multi-frequency wireless communication device allowing communication equipment to be adaptive to a moving location. To this end, there is provided an operator voice input means, an audio output means, an RF transceiver section compatible with an operating frequency of a cellular system, and a micro-controller. While a base station in a communication system is in operation with a mobile subscriber unit, each base station in the communication system discriminates between the intensity of a received signals on each call in progress and provides the result to a network controller. When the unit moves within a cellular communication environment, the controller uses signal intensity information received from the specific unit at each base station as to whether or not the unit is to be handed off. Through this hand-off process of the mobile subscriber unit to subsequent base stations, communication with the unit when the unit moves from a cell site to a succeeding cell site is maintained.

U.S. Pat. No. 5,825,759 (Liu) relates to distributing network services and resources in a mobile communications network. A full mobility data network architecture and method supports global wireless mobile data accessing. A Mobile Distributed System Platform, a mobility agent and a mobile-floating agent are provided for supporting service and resource mobility, and for distributing network services and resources closer to mobile users. In one aspect of the invention, a predictive mobility management algorithm determines where a mobile user or terminal is likely to be. Mobile-floating agents are then established at these locations to permit pre-connection and pre-arrangement of network services and resources for use by the user upon arrival. This allows mobile networks to more intelligently and dynamically provide services to mobile users.

U.S. Pat. No. 5,293,641 discloses a mobile radiotelephone system where a base station, upon receiving a request from a mobile station, ascertains whether the service request can be accepted according to the availability of voice channels in the base station. If not the measured signal strength is compared to a threshold and if above a given level is directed to retry the service request on one or more of a set of channels assigned to neighboring base stations. Otherwise the mobile is directed to retry on one or more of a second set of channels assigned to neighboring base stations.

The foregoing references thus disclose mobile telecommunication networks wherein received signal strength is used during "handover" for the automatic selection of a base station. However, there are situations, particularly when transmitting bulk data, e.g. in a packet data system, where an already selected base station may be generally well suited for conveying data, albeit not immediately the subscriber unit establishes communication. This might be because the base station is temporarily overloaded or when the mobile unit is not ideally located relative to the base station. For example, adequate reception might well be achieved if the mobile unit were to move to a different location where signal strength is higher. However, so far as is known, there is currently no mobile telephone service that allows for this scenario. Certainly, none of the above-referenced patents addresses this need, nor still offers a solution.

SUMMARY OF THE INVENTION

It is therefore an object of the present invention to provide an improved service in a mobile telecommunications network that addresses the drawbacks of hitherto-proposed services and achieves some measure of optimization.

According to a broad aspect of the invention there is provided a method for optimizing a service supplied to a mobile subscriber unit in a mobile telephone system offering a multitude of voice and data services from system base stations to mobile subscriber units, the method comprising the following steps all carried out by a service center: (a) receiving a request for service to be provided to a mobile unit; (b) determining whether prevailing conditions allow for efficient execution of the requested service and if so carrying it out; the method being characterized by otherwise (c) determining a current location of the mobile subscriber unit; (d) monitoring nearby base stations to locate a more suitable base station which can handle the requested service more efficiently, and (e) prompting the mobile subscriber unit to take remedial action by prompting the mobile subscriber unit to move to a specified location better suited for receiving the requested service via the more suitable base station. whereby the requested service can be carried out more efficiently.

Thus the inventive concept resides in requesting the user to cooperate for the sake of efficient service. The efficiency of the service can be associated with selecting the last base site, and/or the base station providing better propagation conditions, thus requiring less power, or in terms of less interference to other users. This cooperation is requested in terms of time and location.

The invention also contemplates an improved service center for optimizing a service supplied to a mobile subscriber unit in a mobile telephone system offering a multitude of voice and data services from system base stations to mobile subscriber units, the service center comprising: a receiving unit for receiving a request for service to be provided to a mobile unit and a processor coupled to the receiving unit for determining whether prevailing conditions allow for efficient execution of the requested service and if so carrying it out, and otherwise prompting the mobile subscriber unit to take remedial action whereby the requested service can be carried out more efficiently, the serving center characterized by the processor being adapted to: i) determine a current location of the mobile subscriber unit, ii) monitor nearby base stations to locate a more suitable base station which can handle the requested service more efficiently; and iii) prompt the mobile subscriber unit to move to a specified location better suited for receiving the requested service via the more suitable base station.

BRIEF DESCRIPTION OF THE DRAWINGS

In order to understand the invention and to see how it may be carried out in practice, a preferred embodiment will now be described, by way of non-limiting example only, with reference to the accompanying drawings, in which.

DETAILED DESCRIPTION OF A PREFERRED EMBODIMENT

Figure 1:
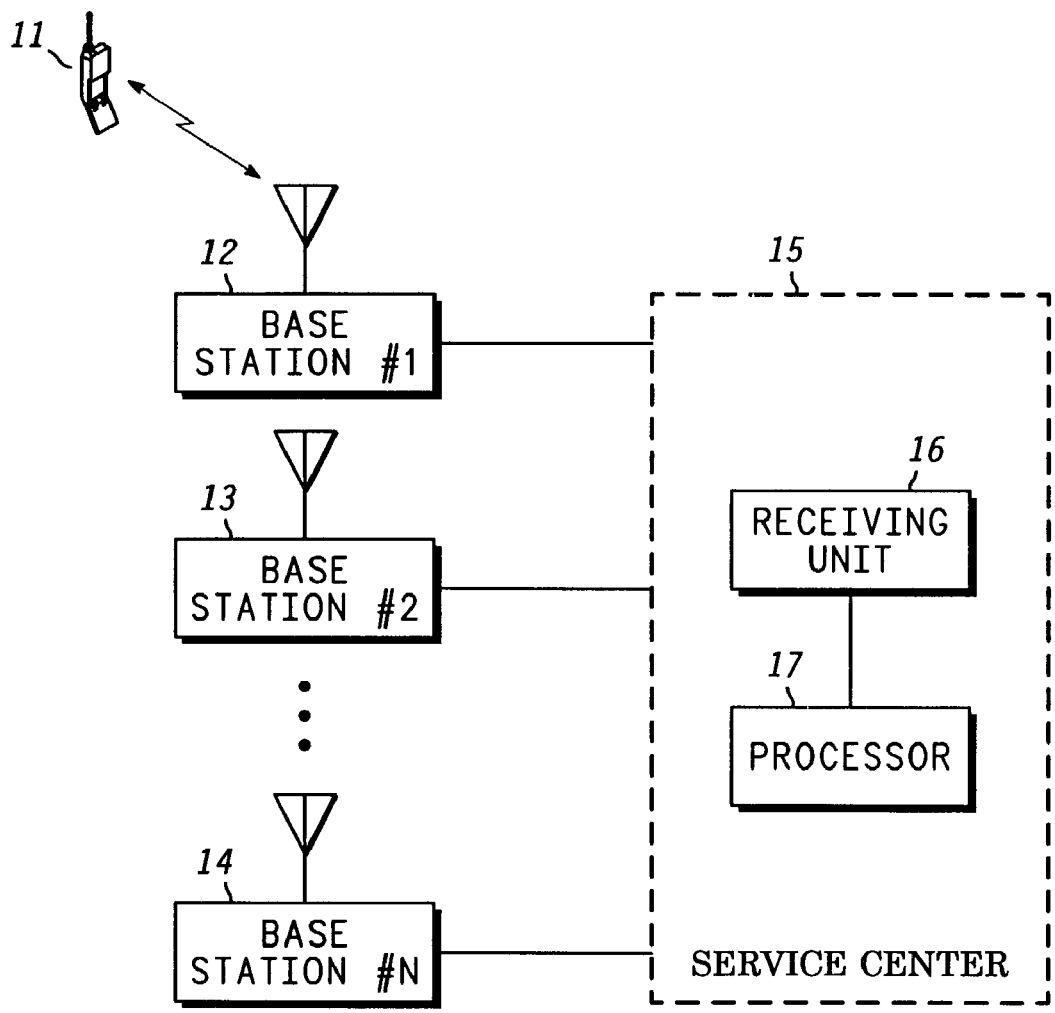
FIG. 1 is a block diagram showing functionally a cellular telephone network within which the present invention finds application.

FIG. 1 shows functionally a cellular telephone network 10 comprising a mobile subscriber unit 11 and a plurality of base stations each serving a respective cell, and of which only three are shown designated 12, 13 and 14. A service center 15 constituted by a conventional network controller monitors activity of the network 10 and controls "handing off" when the mobile subscriber unit 11 approaches the boundary between one cell and another. This aspect of the system is itself well known and requires no further description. The service center 15 includes a receiving unit 16 for receiving a request for service to be provided to the mobile subscriber unit 11, and a processor 17 coupled to the receiving unit 16 for optimizing the service in accordance with a method that will now be described, with particular reference to FIGS. 2 and 3 of the drawings.

Figure 2:
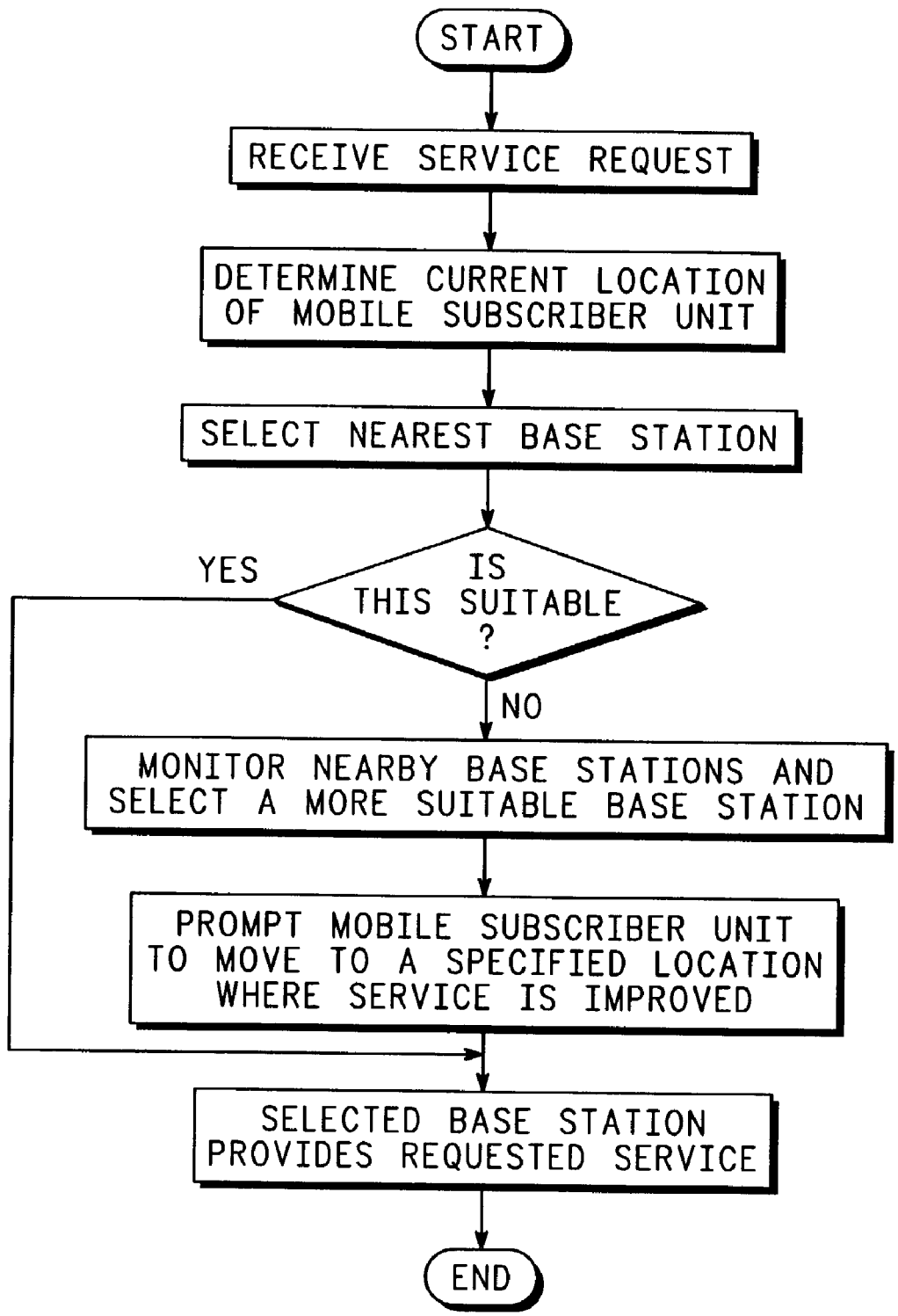
FIG. 2 is a flow diagram showing the principal operating steps associated with a telephone service according to a first embodiment of the invention.

Referring to FIG. 2, there is shown the principal operating steps associated with a telephone service according to a first embodiment of the invention. Upon receiving a service request from or to a mobile subscriber unit 11 via one of the base stations, e.g. base station 12, the service center 15 determines a current location of the mobile subscriber unit 11. The service center 15 then monitors nearby base stations to locate a more suitable base station, e.g. 13 which can handle the requested service more efficiently. If, in fact, the currently selected base station 12 is best suited to provide the service in the current location of the mobile unit, then no further action is taken. Otherwise, the service center 15 prompts the mobile subscriber unit 11 to move to a specified location better suited for receiving the requested service via the more suitable base station 13.

Figure 3:
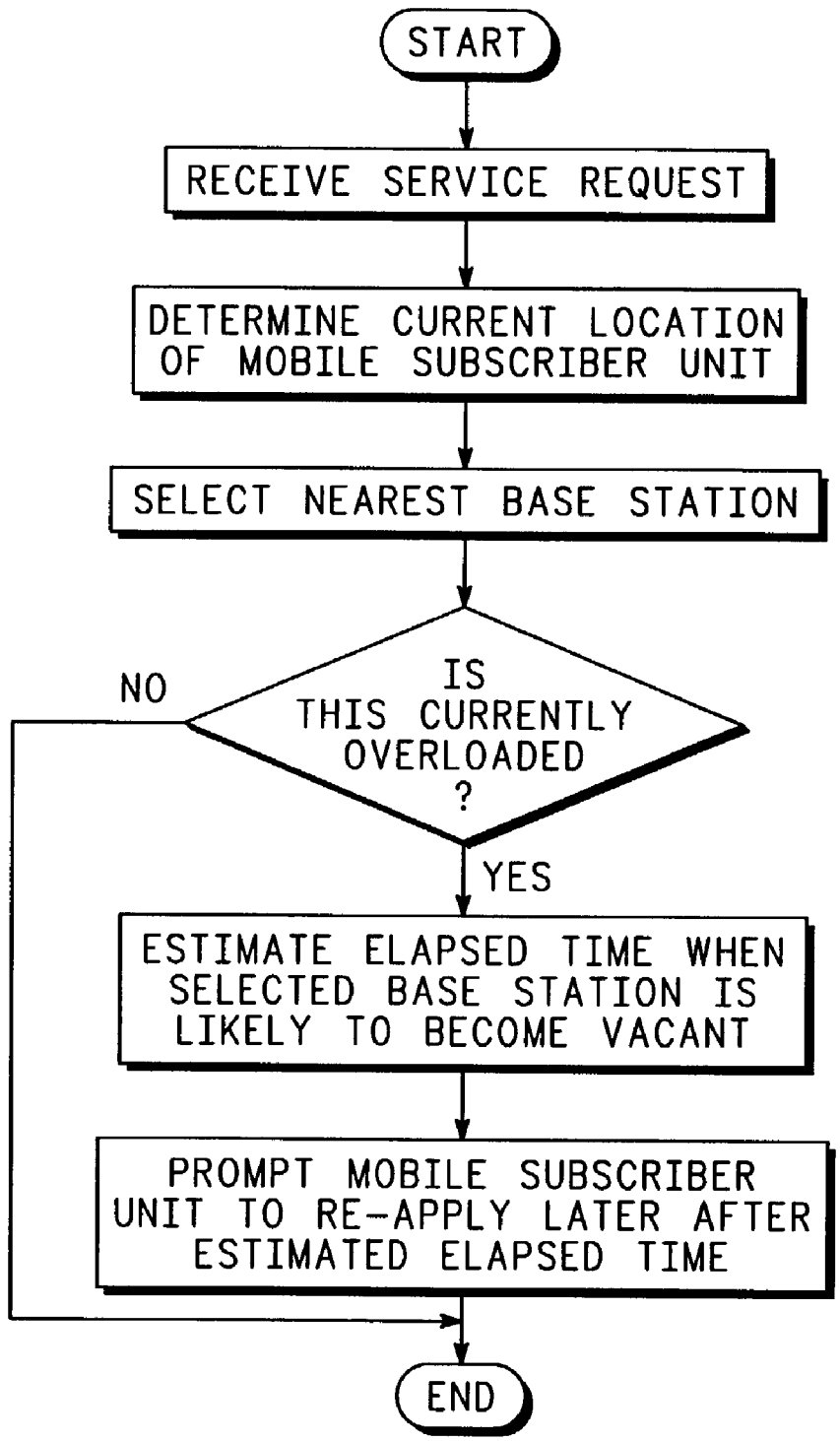
FIG. 3 is a flow diagram showing the principal operating steps associated with a telephone service according to a second embodiment of the invention.

Referring to FIG. 3, there is shown the principal operating steps associated with a telephone service according to a second embodiment of the invention. Upon receiving a service request from the mobile subscriber unit 11 via one of the base stations, e.g. base station 12, the service center 15 determines a current location of the mobile subscriber unit 11. On this basis, the service center 15 selects a base station to handle the requested service. Alternatively, the mobile subscriber unit 11 may initially select the best base station based on the principle of strongest signal, for example. When a service is now required, either originated by the mobile subscriber unit 11, or by the land-line side, the system center will enter the scene to perform optimization i.e., select a different base station, suggest a different time, suggest a different location, or any combination thereof.

The service center 15 then determines whether the selected base station 12 is currently loaded and, if not, directs the requested service to the selected base station 12 for execution. Otherwise, the service center 15 estimates an elapsed time duration whereafter the selected base station 12 is likely to become vacant; and prompts the mobile subscriber unit 11 to apply for the requested service again after said elapsed time duration.

It will be understood that the invention thus resides in the service center determining whether prevailing conditions allow for efficient execution of the requested service and if so carrying it out via a selected base station. Otherwise, the service center prompts the mobile subscriber unit to take remedial action whereby the requested service can be carried out more efficiently. The actual nature of the required remedial action could be via a short vocal message or by means of a short textual message. Other modifications will likewise be apparent to those skilled in the art.

It is thus to be noted that, whilst the invention has been described with particular regard to the improved transmission of data messages, it is not data services alone which can benefit from the invention. Specifically, the invention will also reap more efficient transmission of multimedia and also plain voice like current systems.

Likewise, the invention is not limited to mobile telephone networks using multiple cells. The idea can be implemented for a single cell too. For example, the user can be asked to move to a location where there is a better signal so that power can thereby be reduced. In a multiple cell environment there is an added element of selecting the cell by location, or a location which has the advantage of not interfering with the other cells in the network.

While, as noted above, current voice systems can benefit from the invention, the new services of future systems are going to benefit more, owing to the mix of services on the system. For example, voice may be less demanding and video will be more demanding, and as such the impact of transmitting data files may vary. In these future systems there will also be a concept of QoS (Quality of Service), which the user will demand. It should be also realized that a single user may use up the resources (e.g. power, data rate) of a full cell. Seeing that the resources and the QoS are strongly time and location dependent, it is beneficial to have the option to optimize resource allocation.

It should also be noted that the service establishment handshake is usually done with short messages through communication channels that are very low on communications demand. Hence, they can be used in order to establish with the subscriber time and location for satisfying the subscriber's requirement for higher demand service.

In the method claims that follow, alphabetic characters used to designate claim steps are provided for convenience only and do not imply any particular order of performing the steps.

What is claimed is:

1. A method for optimizing a service supplied to a mobile subscriber unit in a mobile telephone system offering a multitude of voice and data services from system base stations to mobile subscriber units, the method comprising the following steps all carried out by a service center:
   (a) receiving a request for service to be provided to a mobile unit;
   (b) prior to setting up the service determining whether prevailing conditions allow for efficient execution of the requested service and if so setting up the service; the method being characterized by otherwise and without setting up the service
   (c) determining a current location of the mobile subscriber unit;
   (d) monitoring nearby base stations to locate a more suitable base station which can handle the requested service more efficiently; and
   (e) prompting the mobile subscriber unit to take remedial action by prompting the mobile subscriber unit to move to a specified location better suited for receiving the requested service via the more suitable base station whereby the requested service can be carried out more efficiently.

2. The method according to claim 1 wherein the mobile telephone system has multiple cells and the specified location is a different cell in the network to a current cell in which the user is currently located.

3. The method according to claim 1 wherein the specified location is within a current cell in which the user is currently located.

4. The method according to claim 1 wherein step (e) includes vocally prompting the mobile prompting the mobile subscriber unit.

5. The method according to claim 1 wherein step (e) includes prompting the mobile subscriber unit via a displayed message.

6. The method according to claim 1 wherein the message received by the mobile subscriber unit is voice data.

7. The method according to claim 1 wherein the message received by the mobile subscriber unit is multimedia data.

8. The method according to claim 1, wherein the message received by the mobile subscriber unit is non-vocal data.

9. A service center for optimizing a service supplied to a mobile subscriber unit in a mobile telephone system offering a multitude of voice and data services from system base stations to mobile subscriber units, the service center comprising:
   a receiving unit for receiving a request for service to be provided to a mobile unit and
   a processor coupled to the receiving unit for determining, prior to setting up the service, whether prevailing conditions allow for efficient execution of the requested service and if so setting up the service, and otherwise prompting the mobile subscriber unit to take remedial action whereby the requested service can be carried out more efficiently;
   the serving center characterized by the processor being adapted to, without setting up the service:
   i) determining a current location of the mobile subscriber unit,
   ii) monitoring nearby base stations to locate a more suitable base station which can handle the requested service more efficiently; and
   iii) prompting the mobile subscriber unit to move to a specified location better suited for receiving the requested service via the more suitable base station.

10. The service center according to claim 9, wherein the mobile telephone system has multiple cells and the specified location is a different cell in the network to a current cell in which the user is currently located.

11. The service center according to claim 9, wherein the specified location is within a current cell in which the user is currently located.

12. The service center according to any one of the claim 9, wherein the processor is adapted to prompt the mobile subscriber unit vocally.

13. The service center according to claim 9 wherein the processor is adapted to prompt the mobile subscriber unit via a displayed message.

14. The service center according to claim 9 wherein the message received by the mobile subscriber unit is voice data.

15. The service center according to claim 9, wherein the message received by the mobile subscriber unit is multimedia data.

16. The service center according to claim 9 wherein the message received by the mobile subscriber unit is non-vocal data.

* * * * *